(12) United States Patent
Scott et al.

(10) Patent No.: US 9,489,366 B2
(45) Date of Patent: Nov. 8, 2016

(54) INTERACTIVE SYNCHRONIZATION OF WEB DATA AND SPREADSHEETS

(75) Inventors: Matthew Robert Scott, Beijing (CN); Ruochi Zhang, Beijing (CN); Ruihua Song, Beijing (CN); Ji-Rong Wen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1112 days.

(21) Appl. No.: 12/709,267

(22) Filed: Feb. 19, 2010

(65) Prior Publication Data

US 2011/0209048 A1    Aug. 25, 2011

(51) Int. Cl.
G06F 17/00     (2006.01)
G06F 17/24     (2006.01)
G06F 17/30     (2006.01)

(52) U.S. Cl.
CPC ........... *G06F 17/246* (2013.01); *G06F 17/245* (2013.01); *G06F 17/3089* (2013.01); *G06F 17/30861* (2013.01)

(58) Field of Classification Search
CPC ............... G06F 17/245; G06F 17/246; G06F 17/3089; G06F 17/30893; G06F 17/30861
USPC .......................... 715/236, 212, 213, 255, 209
See application file for complete search history.

(56) References Cited

U.S. PATENT DOCUMENTS

| | | | |
|---|---|---|---|
| 5,926,822 A | 7/1999 | Garman | |
| 6,632,249 B2 | 10/2003 | Pollock | |
| 6,691,281 B1 * | 2/2004 | Sorge et al. | 715/234 |
| 6,988,241 B1 | 1/2006 | Guttman et al. | |
| 7,096,422 B2 * | 8/2006 | Rothschiller et al. | 715/212 |
| 7,155,665 B1 * | 12/2006 | Browne et al. | 715/243 |
| 7,174,504 B2 | 2/2007 | Tsao | |
| 7,231,593 B1 * | 6/2007 | Raja et al. | 715/210 |
| 7,325,188 B1 * | 1/2008 | Covington | G06F 17/3089 707/E17.116 |
| 7,949,950 B2 * | 5/2011 | Van Hoof | G06F 17/24 358/1.18 |
| 2002/0036662 A1 * | 3/2002 | Gauthier et al. | 345/835 |
| 2003/0149661 A1 * | 8/2003 | Mitchell et al. | 705/39 |
| 2004/0032420 A1 * | 2/2004 | Allen et al. | 345/700 |
| 2004/0158799 A1 * | 8/2004 | Breuel | 715/513 |
| 2004/0210882 A1 * | 10/2004 | Takeuchi | G06F 8/443 717/141 |
| 2005/0177573 A1 * | 8/2005 | Gauthier et al. | 707/10 |
| 2005/0202392 A1 * | 9/2005 | Allen et al. | 434/362 |
| 2006/0112123 A1 | 5/2006 | Clark et al. | |
| 2006/0112329 A1 * | 5/2006 | Collie et al. | 715/513 |
| 2007/0192265 A1 * | 8/2007 | Chopin et al. | 706/20 |
| 2008/0256432 A1 * | 10/2008 | Sambandam et al. | 715/212 |
| 2009/0119574 A1 * | 5/2009 | Gitlin et al. | 715/209 |
| 2009/0158251 A1 * | 6/2009 | Angrish et al. | 717/115 |
| 2009/0187552 A1 * | 7/2009 | Pinel et al. | 707/5 |

(Continued)

OTHER PUBLICATIONS

Adams et al., "Publishing and Synchronizing Excel 2007 Tables to SharePoint Lists", Microsoft Corporation, Jun. 2007, Retrieved Oct. 22, 2009 from: <<http://msdn.microsoft.com/en-us/library/bb462636(office.11).aspx>>.

Microsoft Research—Excel 2007 Web Data Add-In, retrieved on Feb. 12, 2010 at <<http://research.microsoft.com/en-us/downloads/db5286b6-0bb0-4668-9ebc-c3e9b43a0683/default.aspx>>, 1 page.

(Continued)

*Primary Examiner* — Thu Huynh
(74) *Attorney, Agent, or Firm* — Sandy Swain; Micky Minhas

(57) ABSTRACT

Interactive synchronization of Web data and spreadsheets is usable to build data wrappers based on any type of data found in a document. Such data wrappers can be used to interact with source documents, crawl a network for additional data, map data from across domains, and/or synchronize data from dynamic Web documents.

20 Claims, 11 Drawing Sheets

(56) References Cited

U.S. PATENT DOCUMENTS

2013/0124957 A1* 5/2013 Oppenheimer ... G06F 17/30964
  715/212
2013/0151938 A1* 6/2013 Waldman et al. ............ 715/210

OTHER PUBLICATIONS

"Free Stock Quotes in Excel", retrieved on Dec. 29, 2009 at <<http://www.vertex42.com/ExcelTemplates/excel-stock-quotes.html>>, published Dec. 31, 2005, pp. 1-3.

"How to Insert Refreshable Stock Quotes Into Excel—AllFinancialMatters", retrieved on Dec. 29, 2009 at <<http://allfinancialmatters.com/2006/11/15/how-to-insert-refreshable-stock-quotes-into-excel/>>, published Nov. 15, 2006, pp. 1-18.

"Microsoft Excel: Excel 2007 Web Data Add-In", Microsoft Corporation, Oct. 16, 2007, retrieved Oct. 22, 2009 from <<http://blogs.msdn.com/excel/archive/2007/10/16/excel-2007-web-data-add-in.aspx>>.

Roman, "Pulling Stock Quotes into Microsoft Excel—O'Reilly Media", retrieved on Dec. 29, 2009 at <<http://ondotnet.com/pub/a/dotnet/2001/12/10/excelstocks.html>>, Dec. 10, 2001, pp. 1-3.

* cited by examiner

Weather Document 702

Spokane, WA

| IMAGE | ADVERTISEMENT |

| Detailed ten-day forecast | | | |
|---|---|---|---|
| Day | Forecast | Description | Precip. Chance |
| Oct. 22 | Clear<br>Hi: 45° Lo: 30° | Day: Winds E<br>Night: Fog | 0%<br>5% |
| Oct. 23 | Snow<br>Hi: 40° Lo: 20° | Day: Winds E/NE<br>Night: Fog | 20%<br>25% |
| Oct. 24 | Rain<br>Hi: 42° Lo: 25° | Day: Winds S<br>Night: Fog | 40% |
| ⋮ | ⋮ | ⋮ | ⋮ |
| Oct. 31 | P. Cloudy<br>Hi: 44° Lo: 29° | Day: Winds NW<br>Night: Fog | 10% |

Data Template 704

| Description of Data Selected | Data Type |
|---|---|
| Text | .TXT |
| Image | .IMG, .JPG, .TFT, . . . |
| Temperature | N° |
| Precipitation Chance | N% |
| Hyperlink | .COM, .HTML., . . . |

FIG. 7

INTERACTIVE SYNCHRONIZATION OF WEB DATA AND SPREADSHEETS

BACKGROUND

Today for many information workers, the Internet is a data source rich in business data that is constantly updating and growing. Over time, the amount of data available via the Internet has grown exponentially. Unfortunately, due to the rapid growth of available data, data mining has become less user-friendly. Additionally, much of the data available over the Internet is in a constant state of change, being regularly updated by content providers. To compound the problem, many content providers regularly change the style, structure, or even the hypertext markup language (HTML) used to encode the Web pages that make the data available.

As the number of content providers and the volume of data increases, tools to effectively manage, sort, and manipulate Web data will become even more useful. Unfortunately, no tools exist for managing data that can handle the ever-changing Internet. Existing spreadsheet applications require significant user input to select Web data to be imported, and have limited ability to import data from more than one Web document. Accordingly, there is a need for a user-friendly application that can automatically import data from one or more Web pages.

BRIEF SUMMARY

This summary is provided to introduce simplified concepts for the interactive synchronization of Web data and spreadsheets, which is further described below in the Detailed Description. This summary is not intended to identify essential features of the claimed subject matter, nor is it intended for use in determining the scope of the claimed subject matter. Generally, the interactive synchronization of Web data and spreadsheets described herein involves building and training a data wrapper to allow for the selection and importation of data into a spreadsheet.

In one aspect, a data wrapper may be built corresponding to a spreadsheet document by receiving a set of data selected from a document containing data. The set of data may then be imported from the data document into a spreadsheet document. The data wrapper may also be stored in the spreadsheet document. Additionally, a second set of data may be automatically extracted from the data document based on the earlier selections and then imported into the spreadsheet document as well.

In another aspect, a data wrapper may be trained to collect appropriate data from data documents by receiving a wrapper built from data selected and extracted from a first data document. The training may include determining the appropriate data to be automatically extracted from other data documents based on the data selected and extracted from the first data document, extracting the appropriate data, and storing the appropriate data in a spreadsheet document. The data documents may be available over a network.

In yet another aspect, cross-domain data wrapper mapping may be implemented by receiving data wrappers created from documents available over a network that belong to different domains, and mapping the wrappers together such that data may be accurately imported from, for example, documents with potentially different structures or that are encoded in different markup languages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 is a schematic diagram of an illustrative data template and an illustrative corresponding data document.

DETAILED DESCRIPTION

Overview

Figure 1:
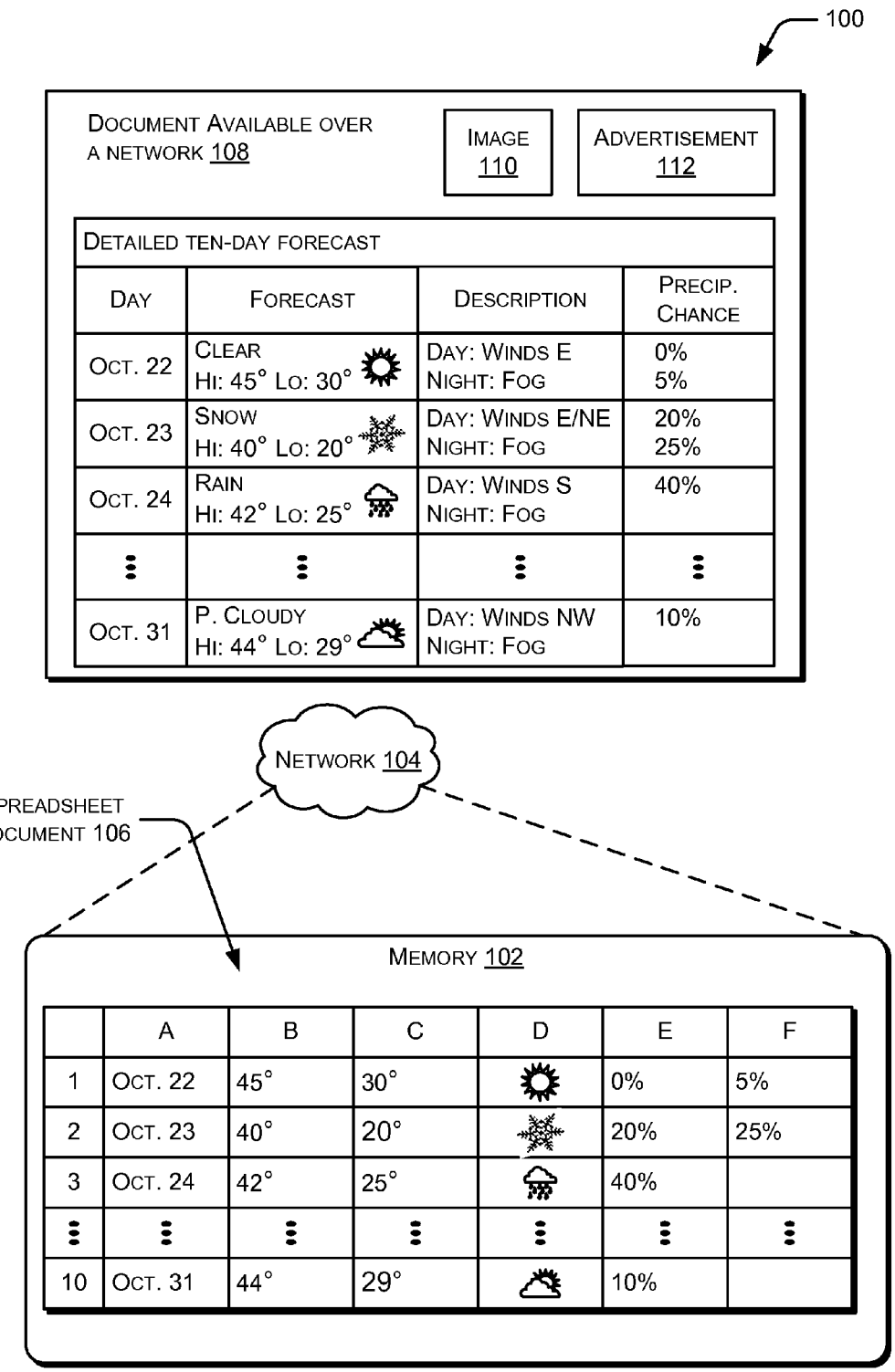
FIG. 1 is a schematic diagram of an illustrative system for interactive synchronization of Web data and spreadsheets.

This disclosure describes interactive synchronization of Web data and spreadsheets. In particular, an augmented Web browsing experience is presented for building, training, inducing, mapping, saving, and sharing a data wrapper that interactively synchronizes data with a spreadsheet document.

As discussed above, the amount of useful data available over the Internet is increasing at a nearly exponential rate. Additionally, Web data is constantly updated, and the structure and encoding of Web documents is often changed. Many data miners, both casual data users and those involved in information technology careers, find it difficult to manipulate the ever-changing data of the Web when using a spreadsheet application, particularly when the data is not textual or when it originates from multiple different sources. These limitations could potentially lead to an inefficient use of one's time when Web data is required for research or computations.

The techniques described in this disclosure may be used for efficiently creating, and training, a data wrapper for use with a spreadsheet application. The wrapper allows the data of a website to be easily and precisely extracted into the desired cells for the purposes of, for example, business calculations and charting. Additionally, a method of mapping data wrappers is disclosed that allows for machine learning and that applies the data structures of one Web document to another, potentially different, Web document.

For creating and training a data wrapper for use with a spreadsheet application, an illustrative user interface is described that leverages the intuitive nature of most Web browsers with a simple spreadsheet document. A user need only describe the data items partially, thereby saving time, by clicking on them in an augmented browser experience, and when ready, can automatically expand the selection, extracting data to the spreadsheet document that is similar to the originally selected data (the "select similar" option). Additionally, if data is not extracted that potentially should have been, the user interface may suggest why the data was not automatically extracted and/or may suggest that the data be selected to correct the incompleteness of the spreadsheet document.

By way of example, the "select similar" option may be used to automatically select additional data, not originally selected, that is similar in type or format to the originally selected data. This way, a user may extract all the preferred data into a spreadsheet without manually selecting all the data to be extracted.

In some examples, the user interface may also provide semantic functionality to simplify the data selection and editing. Furthermore, the user interface may afford users the ability to save, name, and share the data wrapper. The wrapper may be saved to a location in memory of a computer and/or it may be saved directly into the working spreadsheet document. This will allow for later editing of the wrapper and updating of the spreadsheet data, as well as sharing spreadsheet documents that contain dynamic wrappers.

FIG. 1 depicts an illustrative diagram illustrating a high-level overview of an interactive synchronization of Web data and spreadsheet system 100. The system 100 includes memory 102, which resides on network 104 and contains spreadsheet document 106 of a spreadsheet application (not shown). Spreadsheet document 106 is made up of cells defined by both columns and rows, for example, spreadsheet document 106 may contain columns A-F and rows 1-10. For ease of explanation, cells in the following FIGS. will be described in terms of their location within the document. For example, the cell corresponding to "October 22," located in column A, row 1 of spreadsheet document 106 will be referred to as cell 106(A,1). Spreadsheet cells 106(A-F,1-10) may store any type of binary data. For example, spreadsheet cell 106(A,1) contains plain text, while spreadsheet cell 106(D,1) contains an image file.

A document available over a network 108, for example a Web page, is displayed by a user interface for extracting data into the spreadsheet document 106. In addition to data to be extracted, the document available over a network 108 may contain one or more images 110 and/or advertisements 112. For example, the document available over a network 108 may be a Web page corresponding to weather data.

In FIG. 1, the example shows a detailed ten-day weather forecast for Spokane, Wash. from October 22 through at least October 31. Weather data in the document available over a network 108 corresponds to the forecast, description, and chance of precipitation for each respective date. For example, the forecast for October 22 is "clear," with a high temperature (HI) of 45° and a low temperature (LO) of 30°. The description for October 22 is "winds" from the East during the day and "fog" during the night. Finally, the chance of precipitation for October 22 is 0% during the day and 5% during the night. In this example, the sun figure represents the "clear" forecast for October 22, the snowflake figure represents the "snow" forecast for October 23, the rain cloud figure represents the "rain" forecast for October 24, and the sun behind a cloud figure represents the "partly cloudy" forecast of October 31. Additionally, not every date may contain the same amount or type of data. For example, the forecasts for October 24 and October 31 only have a precipitation chance during the day.

The data stored in spreadsheet document 106 may correspond to the data of at least one network document. In this example, the data of spreadsheet document 106 corresponds to the data of the detailed ten-day forecast for Spokane, Wash. found in document available over a network 108. For example, the data of row 10 of spreadsheet document 106, that being cells 106(A-F,10), corresponds to the data found in document available over a network for October 31. Additionally, more or less data could be imported into the spreadsheet document 106 from the document available over a network 108 than is shown in this example.

Additionally, FIG. 1 describes a document which contains data that seems to be in tabular form; however, this may not always be the case. For example, a different document available over a network (not shown) could contain the same data as document available over a network 108, yet the data may be displayed in a completely different format.

In data mining, a data wrapper is a trainable module for parsing text that searches for identifiable data structures within the text. Additionally, through wrapper induction, the modules can be programmed to train themselves by creating subsets of data structures based on particular attributes. In particular, wrapper induction is the process by which a data wrapper is used to import data from documents other than the document with which the wrapper was built. Wrapper induction may be used to import data from multiple documents not available over a network, documents available over a network and belonging to a single domain, or even documents available over a network belonging to different domains In order to build and train a data wrapper (not shown), data may be selected from the document available over a network 108 for importing into the spreadsheet document 106. By way of example, and not limitation, a data wrapper may have been built by selecting the weather data associated with October 22 on the document available over a network 108. After filling row 1 of spreadsheet document 106 with the weather data associated with October 22, a user may choose to use a "select similar" option to allow the interactive synchronization of Web data and spreadsheets system 100 to automatically select additional data that matches the user selected data. In this example, by choosing "select similar," row 2 of spreadsheet document 106 would automatically be filled with the weather data associated with October 23 from the document available over a network 108. However, because the forecasts for at least October 24 and October 31 contain only one unit of data for precipitation chance, while the previously selected data contained two units, the data wrapper may fail to recognize any of the weather data for those dates. In this case, the user may be required to continue to train the wrapper manually by additionally selecting all the weather data for at least one of the dates with a different structure, i.e., dates with only one precipitation chance, prior to choosing "select similar."

Figure 2:
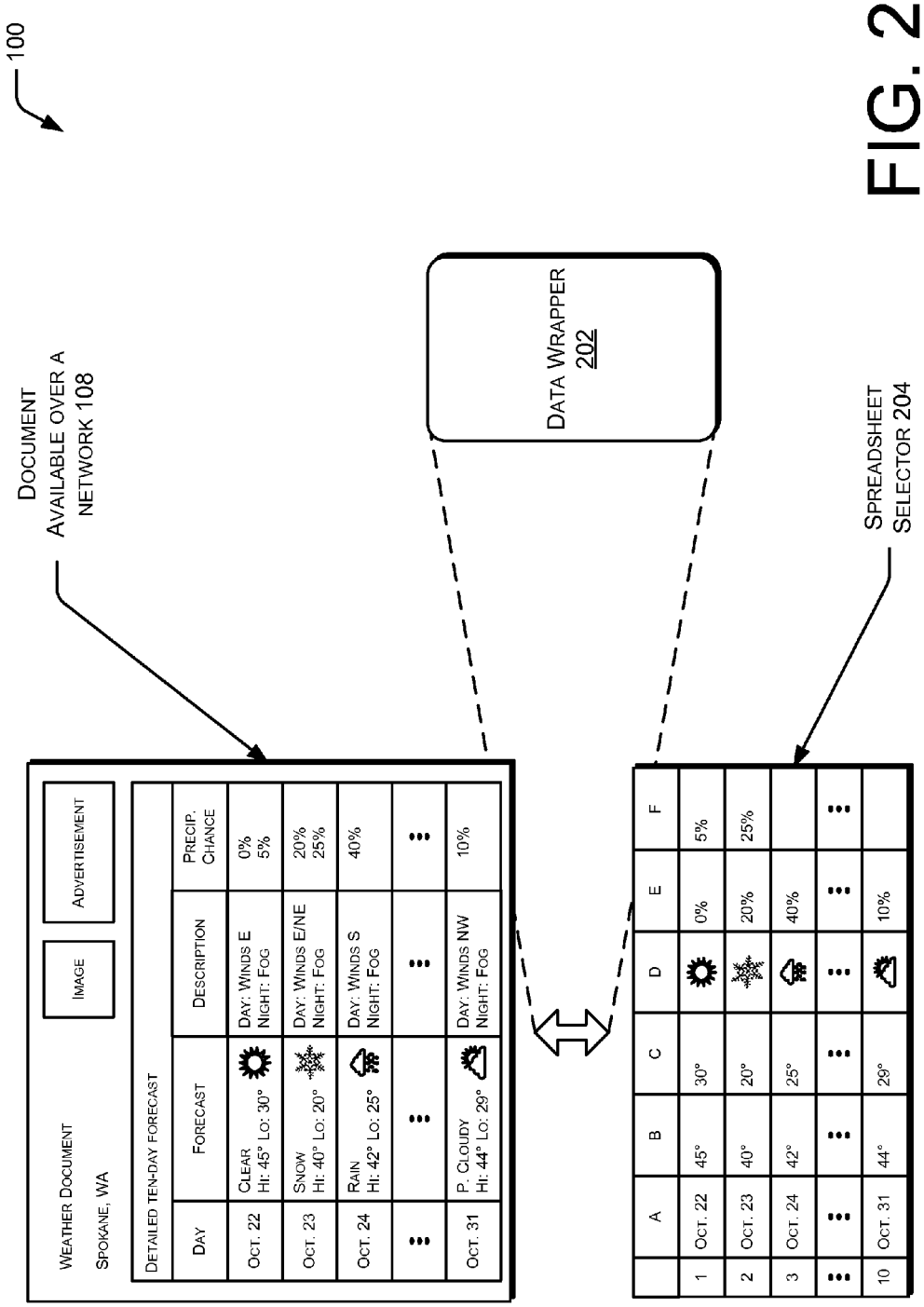
FIG. 2 is a schematic diagram of an illustrative system for interactive synchronization of Web data and spreadsheets using a data wrapper.

FIG. 2 depicts an illustrative diagram illustrating an interactive synchronization of Web data and spreadsheet system 100 using a data wrapper 202. Here, spreadsheet selector 204 and document available over a network 108 may be used to form data wrapper 202. Data wrapper 202 may contain data corresponding to the document available over a network 108 as well as a mapping between the data corresponding to the document available over a network 108, the spreadsheet selector 204, and the spreadsheet document 106 of FIG. 1.

A user interface (not shown) may be utilized to present an augmented Web browser experience (seen as document available over a network 108 alongside spreadsheet selector 204), where a user may make selections of data from a document over a network 108 and the selections may be displayed on the spreadsheet selector 204 prior to importing the data into the spreadsheet document 106 of FIG. 1. As described above with reference to FIG. 1, the data displayed in the spreadsheet selector 204 corresponds to data selected from the document available over a network 108 and provides a substantially real time feedback to the user to show data that has been selected.

In one implementation, the data wrapper 202 created by using the document available over a network 108 and the spreadsheet selector 204 may be encoded using extensible markup language (XML) encoding, or it may be encoded by way of any other markup language known, or not encoded at all.

Figure 3:
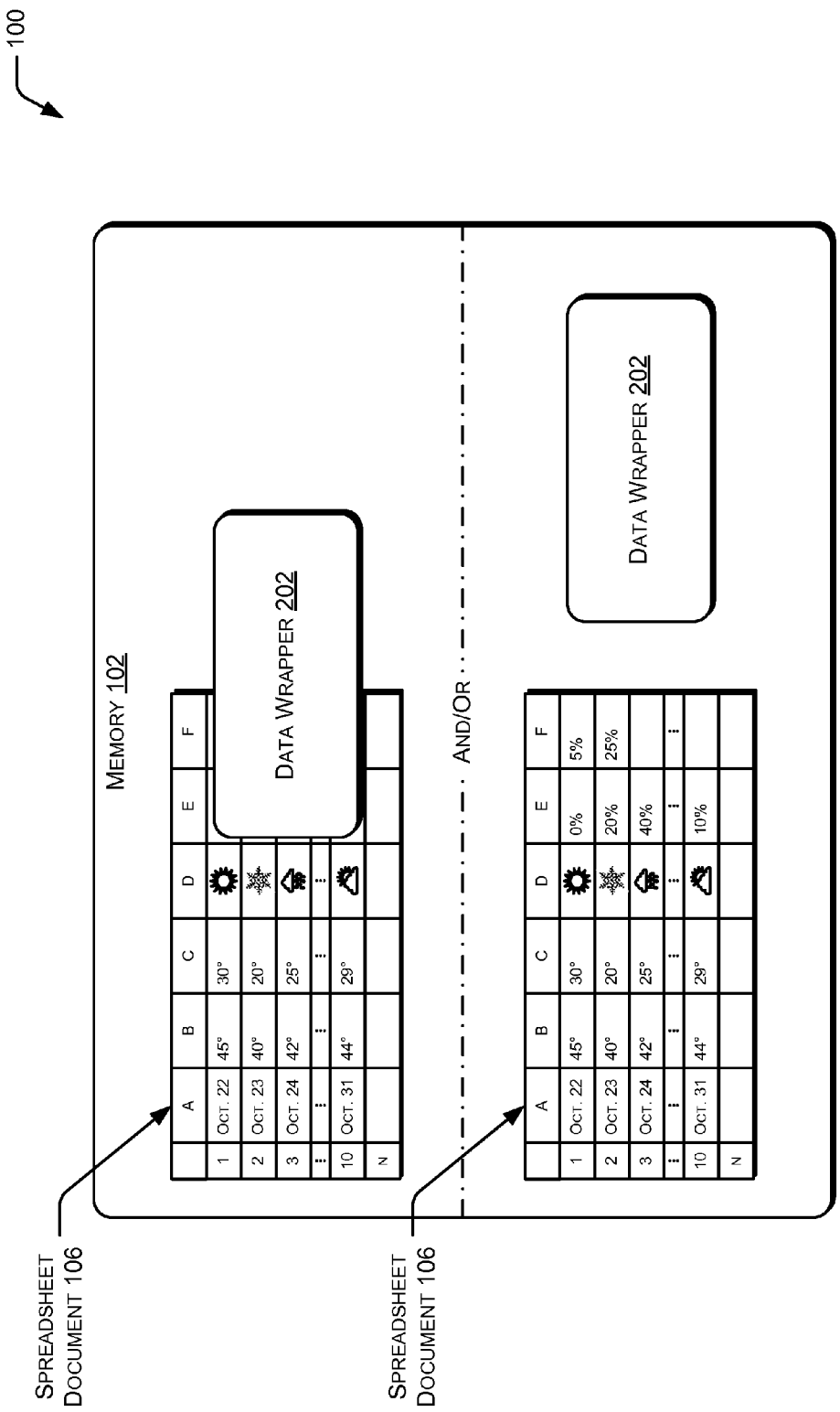
FIG. 3 is a schematic diagram of illustrative methods for data wrapper storage.

FIG. 3 depicts an illustrative diagram further illustrating an interactive synchronization of Web data and spreadsheet system 100 utilizing a spreadsheet document 106 stored in memory 102 and a data wrapper 202. In one example, data wrapper 202(A) is shown being stored or embedded in the spreadsheet document 106(A) that corresponds to the data of data wrapper 202(A). Additionally, wrapper 202(A) may also be stored in a different document (not shown), as with a compilation of wrappers. In another aspect, data wrapper 202(B) may be stored in another location in memory 102. In yet another aspect, data wrapper 202(A) may be stored in the corresponding spreadsheet document 106(A) while a copy of data wrapper 202(A) (not shown) may be stored in another location of memory 102.

FIGS. 1, 2, and 3 provide simplified examples of suitable data wrapper and data synchronization systems according to the present disclosure. However, other configurations are also possible. For example, while the document available over a network 108 is shown as a Web document, any document available over any network could be used. Further, documents not available over a network could also be used, for example, plain text documents, word processing documents, other spreadsheet documents, and even Web documents (such as hypertext markup language (HTML) documents) that are not available over any networks but are stored locally or on non-networked devices. Additionally, data can be selected from any type of network document, and should not be limited to weather data or weather forecast documents. Additionally, while spreadsheet document 106 and spreadsheet selector 204 have been shown to include six columns (e.g., columns A-F in FIGS. 1, 2, and 3) and 10 rows (e.g., rows 1-10 in FIGS. 1 and 2), in practice, spreadsheet document 106 and spreadsheet selector 204 may contain any number of columns, rows, or cells.

Illustrative Computing Environment

Figure 4:
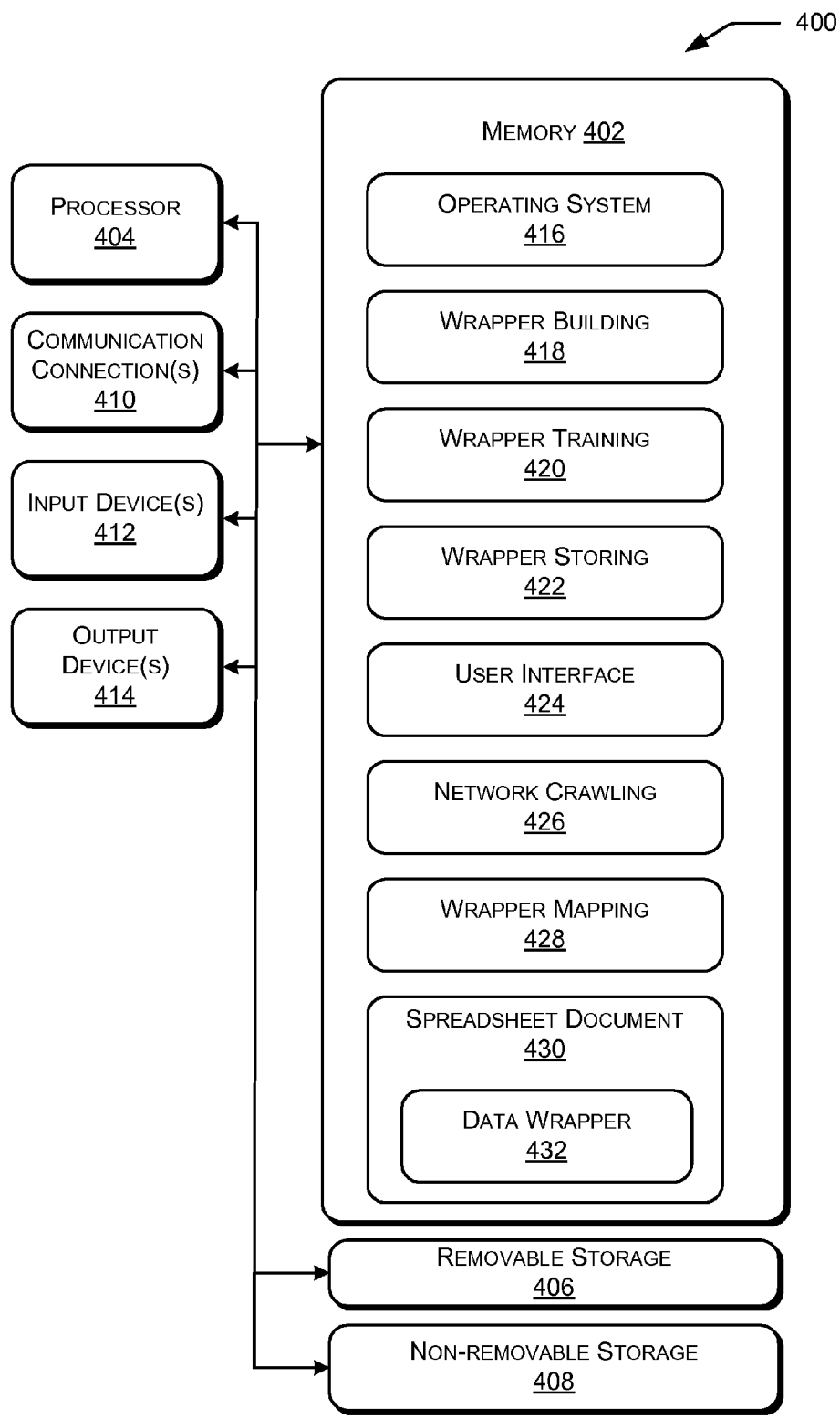
FIG. 4 is a block diagram of a computer environment showing an illustrative system in which an interactive synchronization of Web data and spreadsheets system can be implemented.

FIG. 4 provides an illustrative overview of one computing environment 400, in which aspects of the invention may be implemented. The computing environment 400 may be configured as any suitable computing device capable of implementing an interactive synchronization of Web data and spreadsheet system. By way of example and not limitation, suitable computing devices may include personal computers (PCs), servers, server farms, datacenters, or any other device using memory technologies that are susceptible to failure of memory blocks.

In one illustrative configuration, the computing environment 400 comprises at least a memory 402 and one processing unit 404. The processing unit 404 may be implemented as appropriate in hardware, software, firmware, or combinations thereof. Software or firmware implementations of the processing unit 404 may include computer- or machine-executable instructions written in any suitable programming language to perform the various functions described.

Memory 402 may store program instructions that are loadable and executable on the processor 404, as well as data generated during the execution of these programs. Depending on the configuration and type of computing device, memory 402 may be volatile (such as RAM) and/or non-volatile (such as ROM, flash memory, etc.). The computing device or server may also include additional removable storage 406 and/or non-removable storage 408 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 402 may include multiple different types of memory, such as static random access memory (SRAM), dynamic random access memory (DRAM), or read-only memory (ROM).

Memory 402, removable storage 406, and non-removable storage 408 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 402, removable storage 406, and non-removable storage 408 are all examples of computer storage media. Additional types of computer storage media that may be present include, but are not limited to, phase change memory (PRAM), SRAM, DRAM, other types of random access memory (RAM), ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable media.

The computing environment 400 may also contain communications connection(s) 410 that allow the computing environment 400 to communicate with a stored database, another computing device or server, user terminals, and/or other devices on a network, such as network 104 of FIG. 1.

The computing environment 400 may also include input device(s) 412 such as a keyboard, mouse, pen, voice input device, touch input device, etc., and output device(s) 414, such as a display, speakers, printer, etc.

Turning to the contents of the memory 402 in more detail, the memory 402 may include an operating system 416 and one or more application programs or services for implementing the interactive synchronization of Web data and spreadsheet system 100. In one implementation, the memory 402 includes a wrapper building module 418. The wrapper building module 418 includes, but is not limited to, logic configured to build a data wrapper containing data mined from a document to be stored in a spreadsheet. In one aspect, the wrapper building module 418 is located in the memory 402 as shown in FIG. 4. Alternatively, however, the wrapper building module 418 may be located onboard the processor 404. As discussed in further detail, wrapper building module 418 includes, but is not limited to, logic configured to receive data selected from a document, extract similar data, and import the selected and extracted data into a spreadsheet document.

The memory 402 further includes a wrapper training module 420, a wrapper storing module 422, a user interface module 424, a network crawling module 426, a wrapper mapping module 428, and a spreadsheet document 430 that is capable of storing a data wrapper 432. The wrapper training module 420 may be configured to train a data wrapper to extract similar data from the same document or from other documents based on previous user selections. The wrapper storing module 422 includes, but is not limited to, logic configured to store and name data wrappers. The user interface module 424 includes, but is not limited to, logic configured to provide a user interface for displaying, storing, naming, and sharing data wrappers. In one aspect, the user interface module is configured to provide graphical notifications that aid in the interactivity of the synchronization of Web data to a spreadsheet by signaling to a user what data may be missing from a selection or from where the data originated. The network crawling module 426 includes, but is not limited to, logic configured to crawl a list of network documents to find data similar to a user's original data selections or similar to an already created data wrapper. The wrapper mapping module 428 includes, but is not limited to, logic configured to map the data from one data wrapper to another data wrapper. In one aspect, the wrapper mapping module 428 is configured to provide cross-domain mapping. The spreadsheet document 430 includes, but is not limited to, logic configured to display data in tabular form and store data for manipulation, calculation, and sorting. Additionally, in one aspect, the spreadsheet document 430 may store the data wrapper built by the wrapper building module 418.

Illustrative User Interfaces and Templates

Figure 5:
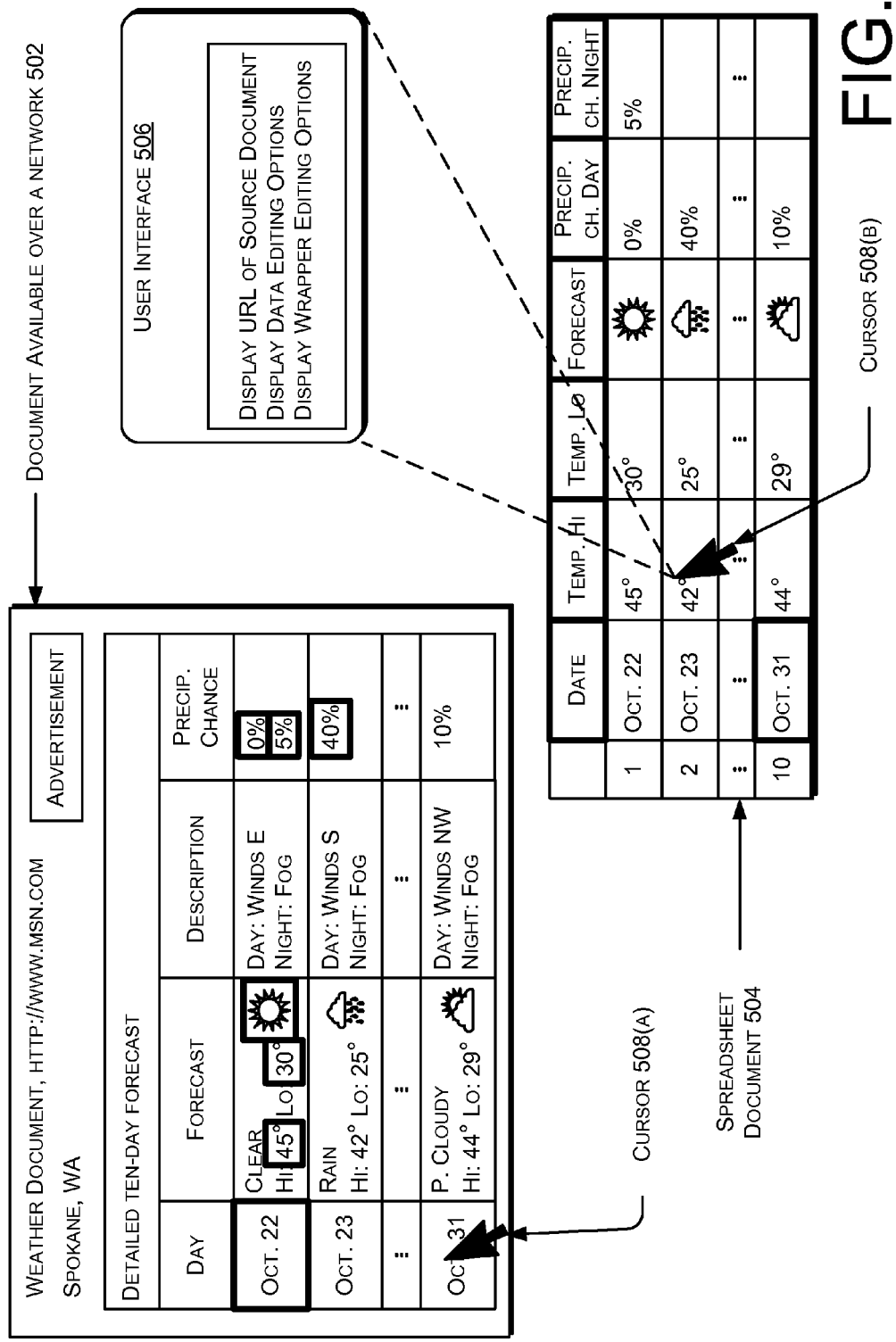
FIG. 5 is a schematic diagram of an illustrative document for synchronizing with an illustrative spreadsheet document along with an illustrative user interface for displaying user options.

FIG. 5 is an illustrative diagram illustrating a document available over a network 502, a corresponding spreadsheet document 504, a user interface 506, and a cursor 508. By way of example, and not limitation, each column of spreadsheet document 504 contains at least 10 rows, and each row contains at least 6 columns. However, virtually any sized spreadsheet document, containing any number of columns and rows, may be used depending on the data to be collected, for example. Further, by way of example, and not limitation, the document available over a network 502 may be located on a network such as the Internet, and its specific location may be described by a Uniform Resource Locator (URL). In this example, the document available over a network 502 is a weather document and is located at http://www.msn.com; however, any document located at any URL, or not available on a network at all, may be used.

In one aspect, when cursor 508 hovers over a location on the document available over a network 502, a graphical indication on the spreadsheet document 504 will identify the corresponding data. For example, when cursor 508 is in position 508(A), hovering over the date (day column) of the document available over a network 502 that corresponds to "October 31," a graphical indication may be displayed on the spreadsheet document to signal the location of that specific date data. By way of example, and not limitation, this can be seen by the dark black outline around spreadsheet document cell 504(Date,10).

In another aspect, data selection recommendations may be made in the form of graphical indications on the document available over a network 502. For example, if data is selected by a user corresponding to the weather forecast for October 22 (the selected data being those elements with dark black outlines in the October 22 row), a graphical indication may direct the user to also select the precipitation chance for October 23 (also shown with a dark black outline). This recommendation will aid the user in selecting appropriate data for training the data wrapper (not shown). As was discussed in reference to FIG. 1, the weather data associated with October 23 may have been ignored by the wrapper builder initially because the weather data is of a different structure. However, the data selection recommendation may preempt the need to re-train the wrapper by providing a recommendation to the user about similar data that may be missed by the "select similar" option.

By way of example, and not limitation, the "select similar" option may be used to automatically select additional data that was not originally selected. In this example, if a user activated the "select similar" option after manually selecting the weather data of October 22 (shown with dark black outlines), the wrapper builder may fail to automatically select the precipitation chance of for October 23 (also shown with a dark black outline) because only one attribute exists in that column for that date. Therefore, in this instance, the data selection recommendation described above may aid the user by highlighting that the precipitation chance for October 23 should be manually selected prior to activating the "select similar" option. Additionally, this would help insure that all the weather data for October 31 would also be selected, because in this example the precipitation chance for October 31 contains only one attribute as well.

In another aspect, graphical labels may be presented on the spreadsheet document 504 corresponding to the type of data imported from the document available over a network 502. By way of example, and not limitation, the column labels of spreadsheet document 504 (shown with dark black outlines) indicate the type of data for each column. In this implementation, rather than the columns being labeled A-F (as in earlier examples), the columns are labeled based on the type of data stored, such as "Date," "Temp. Hi," "Temp. Lo," "Forecast," "Precip. Ch. Day," and "Precip. Ch. Night." Other data types may be imagined as well, such as "Image" rather than "Forecast" for columns that store image files.

In yet another aspect, a user interface 506 may be displayed when a cursor 508 hovers over, or selects, a cell in the spreadsheet document 504. For example, when cursor 508 is in position 508(B), a user interface 506 may be displayed that allows a user to view properties and options. By way of example, and not limitation, the user interface 506 may display the URL of the source document for the data at the corresponding cell, it may display data editing options for editing the particular data at the corresponding cell, and/or it may display wrapper editing options for editing the entire wrapper, or part of the wrapper, corresponding to the spreadsheet document 504.

Figure 6:
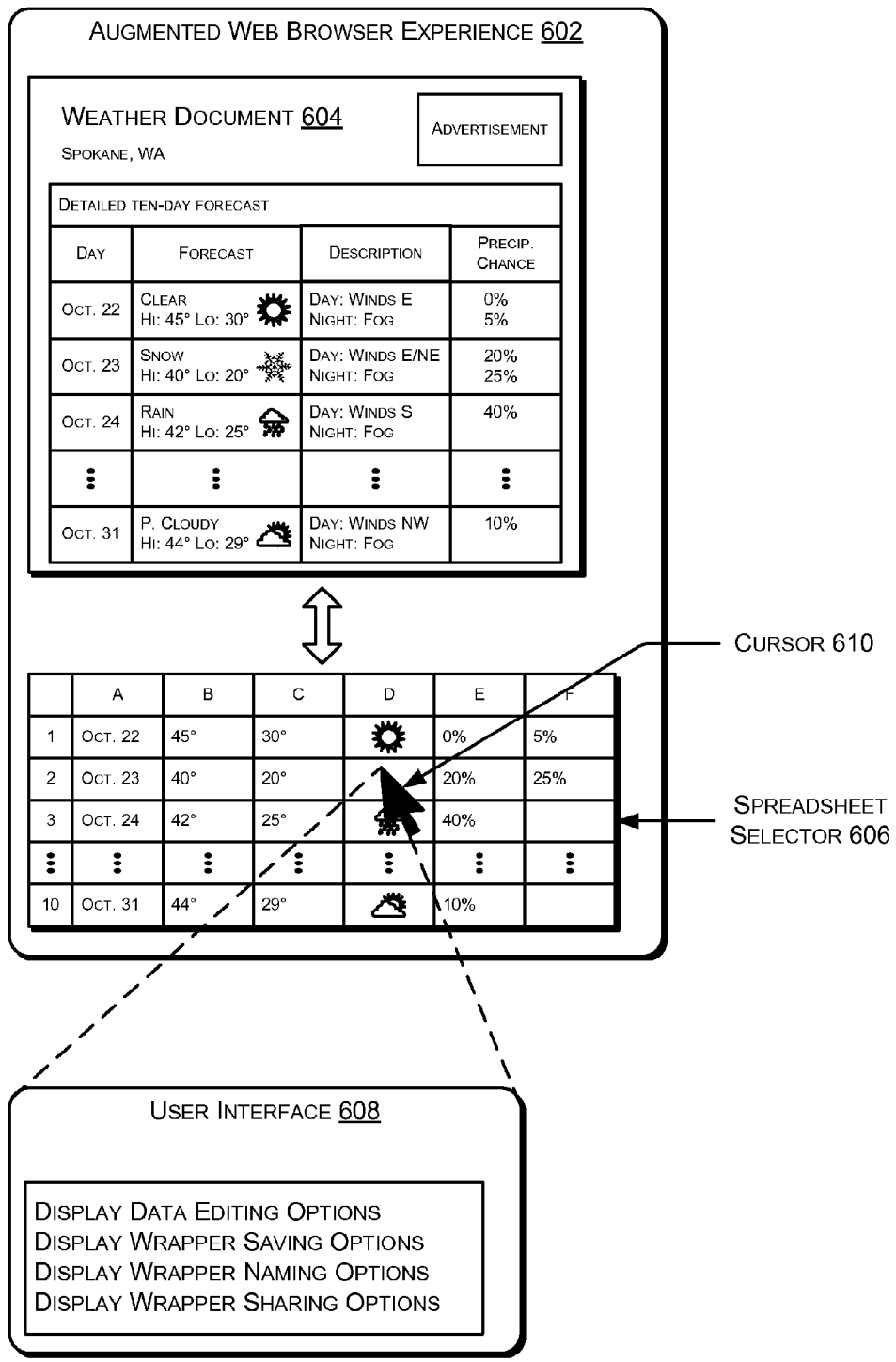
FIG. 6 is a schematic diagram of an illustrative augmented Web browser experience for interactive synchronization of Web data using a spreadsheet selector, along with an illustrative user interface for displaying user options.

FIG. 6 depicts an illustrative diagram illustrating an augmented Web browser experience 602 which displays a weather document 604 and a spreadsheet selector 606. FIG. 6 also depicts a user interface 608 and a cursor 610. By way of example, and not limitation, the data described is weather data from a weather document 604 for the date range of October 22 to October 31. As described above in reference to FIG. 2, spreadsheet selector 606 provides visual aid for a user in selecting (building and training) a data wrapper. Prior to importing any data from the weather document 604 into a spreadsheet document (not shown), the spreadsheet selector 606 displays what data will be imported.

In the example shown in FIG. 6, a user interface 608 may be displayed when a cursor 610 hovers over, or selects a cell of the spreadsheet selector 606. For example, when cursor 610 hovers over spreadsheet selector cell 606(D,2), a user interface 608 may be displayed that allows a user to view properties and options. By way of example, and not limitation, the user interface 608 may display data editing options for editing the particular data at the corresponding cell, it may display wrapper saving options for saving the particular data wrapper, it may display wrapper naming options for naming the particular data wrapper, or it may display wrapper sharing options for sharing the particular data wrapper, for example with other users or as a part of a social networking activity. FIG. 7 is an illustrative diagram illustrating a weather document 702 and a data template 704. Again, by way of example, and not limitation, the data described is weather data from a weather document 702 for the date range of October 22 to October 31. The data template may be used by the data wrapper (not shown) to store data types corresponding to the data imported from the weather document 702 into a spreadsheet document (not shown). In this example, a two column template is used to correlate the description of the data selected (column 1) with the corresponding data type (column 2). For example, "Text" data may be in the form of .txt files, "Image" data may be .img, .jpg, .tft files, or any other type of image file, "Temperature" data, other degree of measurement data, may be described as n°, "Precipitation Chance" may be described as n %, and "Hyperlink" data may be .com or .html. However, the template 704 may include additional and/or different descriptions of data and data types, depending on the documents from which data is to be collected.

The data template 704 may aid the data wrapper (not shown) by providing more understanding of the data type required. By way of example, and not limitation, data template 704 may make the "select similar" option more accurate by teaching the data wrapper to automatically select all n % attributes (that is, data followed by a percent symbol) regardless of the structure of the data in the document. For example, once precipitation chance is correlated with n % in the template, the data wrapper may automatically select all data in the precipitation chance column when the "select similar" option is activated rather than only selecting data matching the format of the originally selected data (e.g., dates with two precipitation chance attributes). Additionally, by storing the data template with the data wrapper and referring to it when searching other documents, the data wrapper will be able to identify specific types of data regardless of the location of the data in the document. For example, based on the data template of FIG. 7, if a data wrapper detects a % symbol in a weather document, it might automatically recognize that the data corresponds to precipitation chance even if the data was not properly labeled as such.

Importing Data from Multiple Documents

Figure 8:
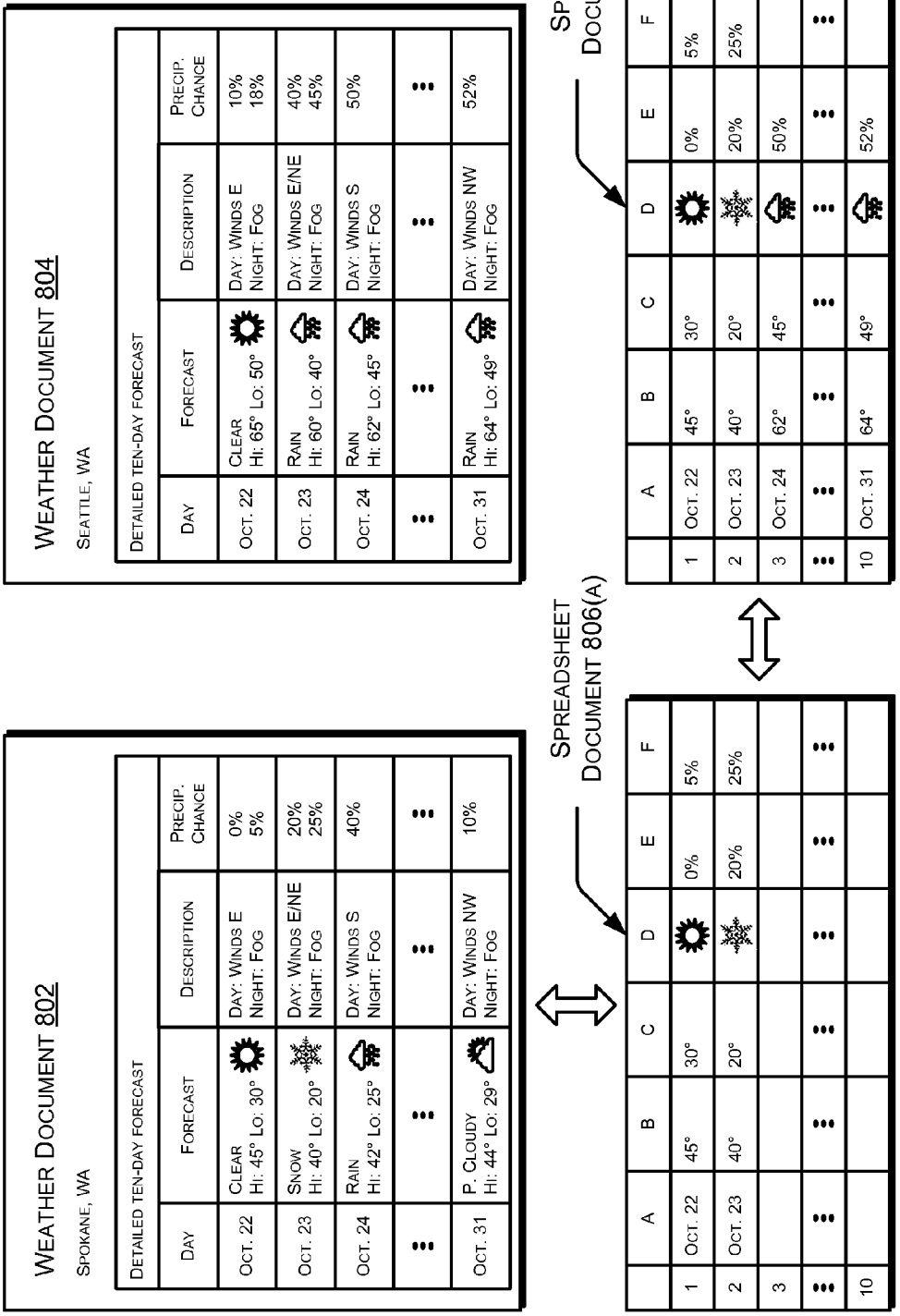
FIG. 8 is a schematic diagram of an illustrative method for importing data from different documents.

FIG. 8 is an illustrative diagram illustrating the use of a data wrapper (not shown) to import data from two different weather documents 802 and 804 into a spreadsheet document 806. By way of example, and not limitation, the two different weather documents 802 and 804 describe weather forecasts of the same date range for two different cities. A data wrapper (not shown) can be built and trained to import data from one document and then that wrapper can be used to import similar data from another document.

For example, weather data corresponding to October 22 and October 23 is imported from weather document 802 into spreadsheet document 806, seen here as 806(A). Based on the data imported, weather data corresponding to October 24-October 31 may then be imported from weather document 804 into spreadsheet document 806, seen here as 806(B).

In one aspect, rather than importing only portions of data from each weather document 802 and 804, all the data from each weather document 802 and 804 may be imported into spreadsheet document 806. Additionally, weather documents 802 and 804 may be documents available over a network, such as Web documents available over the Internet. In one aspect, weather documents 802 and 804 may be Web documents belonging to the same domain. In another aspect, weather documents 802 and 804 may be Web documents belonging to different domains, for example weather document 802 may be found at http://www.msn.com while weather document 804 may be found at http://www.weather.com. In yet another aspect, weather documents 802 and 804 may not be available over any networks.

FIGS. 4-8 provide simplified examples of suitable data wrapper and data synchronization systems according to the present disclosure. However, other configurations are also possible. For example, while the document available over a network 502 is shown as a Web document, any document available over any network could be used. Further, documents not available over a network could also be used, for example, plain text documents, word processing documents, other spreadsheet documents, and even Web documents (such as HTML documents) that are not available over any networks but are simply stored locally or on non-networked devices. Additionally, while weather documents 604, 702, 802, and 804 are shown to contain weather data, any document containing any type of data could be used. Data may be selected from any type of document, and should not be limited to weather data or weather forecast documents. Additionally, while spreadsheet documents and selectors have been shown to include six columns and 10 rows, in practice, they may contain any number of columns, rows, or cells.

Figure 9:
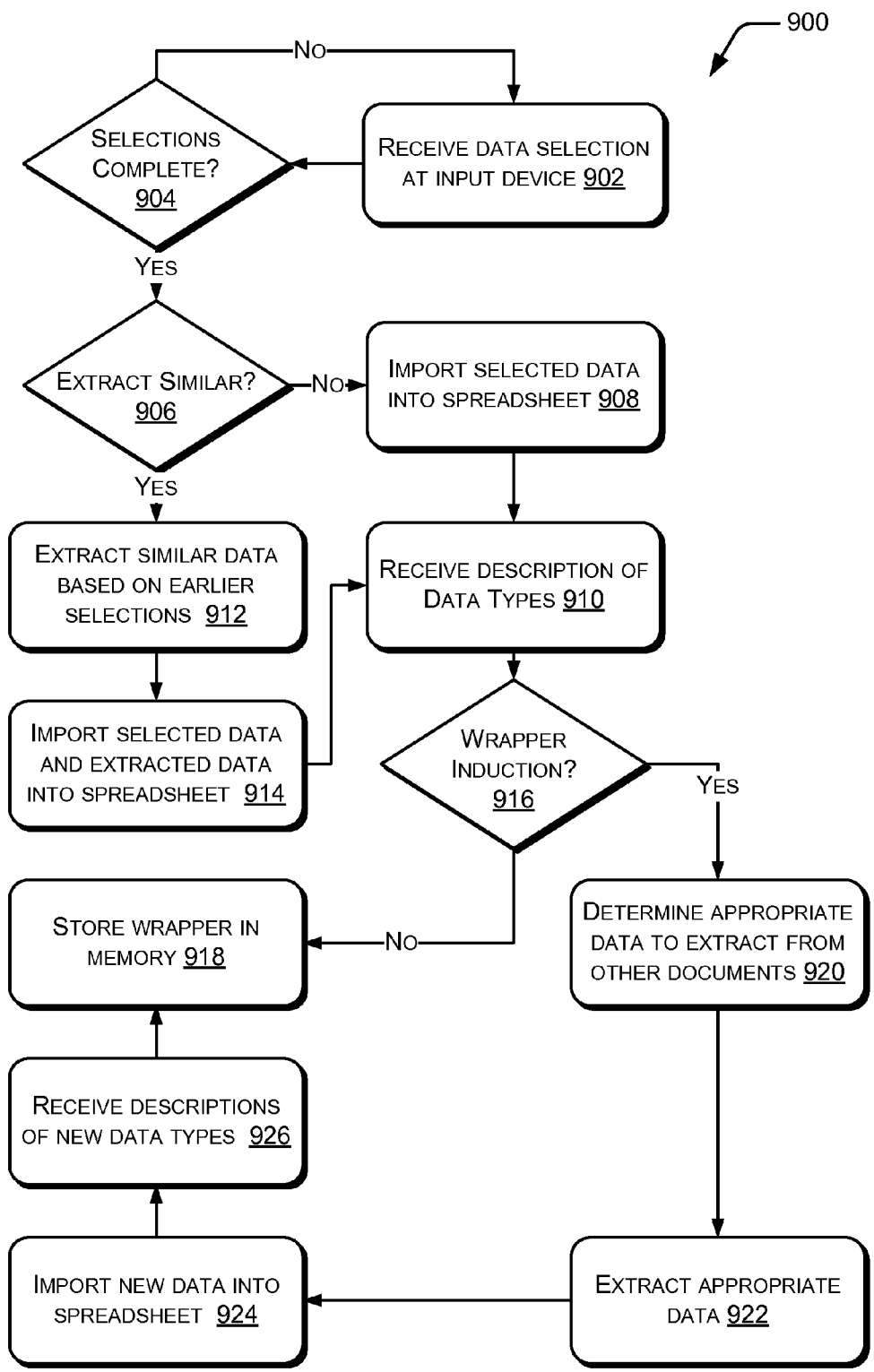
FIG. 9 is a flowchart illustrating details of an interactive synchronization of Web data and spreadsheets method.

FIG. 9 is a flow diagram of one illustrative method 900 of wrapper building, training, and induction. As discussed above, wrapper induction is the process by which a data wrapper is used to import data from documents other than the document with which the wrapper was built. The method 900 may, but need not necessarily, be implemented using the interactive synchronization of Web data and spreadsheet system 100 shown in FIG. 1. In this particular implementation, the method 900 begins at block 902 in which the method 900 receives a data selection at an input device from a user. Generally, the data being selected will be data from a document to be ultimately imported into a spreadsheet and stored in a data wrapper. At decision block 904, the method 900 determines whether data selection is complete. If data selection is not complete, that is, the user or other data selection implementation is still selecting data from a document, the method 900 returns to block 902 to continue receiving data selections. If, however, data selection is complete, the method 900 determines at decision block 906 whether to extract similar data from the document. Generally, this will be determined based on whether a user or other selection implementation has selected the "select similar" option.

If similar data is not to be extracted, at block 908, method 900 imports the data selected at the input device into a spreadsheet and then receives descriptions of each data type that was just imported at block 910. These descriptions will be used in conjunction with a data template to store data types for later use, including wrapper induction and labeling of spreadsheet documents. However, if similar data is to be extracted from the same document, method 900 extracts the similar data from the document at block 912 based at least in part on the earlier selections which were received at block 902. Method 900 then imports both the received selected data and the extracted similar data into the spreadsheet at block 914 and proceeds to receive the data type descriptions at block 910.

At decision block 916, method 900 determines if wrapper induction is required. Generally this will be required if a user, software program, or other selection implementation decides to induce the wrapper to import data from additional documents. Prior to decision block 916, all data imported into the spreadsheet came from the same document. If wrapper induction is not requested, method 900 will terminate at block 918 by storing the wrapper in the memory. In one aspect, the wrapper will be stored in the spreadsheet document. Additionally, the wrapper may be encoded as an XML document prior to storing. If wrapper induction is requested, however, method 900 will determine the appropriate data to extract from other documents at block 920. For example, the determination may consist of searching documents, other than the original document, for data matching the data originally extracted. The wrapper may determine that data matches based on data type, document layout, or metadata stored in the document that refers to the data.

The appropriate data is then extracted from the other documents at block 922, and imported into the spreadsheet at block 924. The method 900 then receives data type descriptions of the new data for the data template at block 926, and finally terminates at block 918 after storing the wrapper in memory. By way of example, and not limitation, wrapper induction may be used to import data from multiple documents not available over a network, documents available over a network and belonging to a single domain, or even documents available over a network belonging to different domains.

Cross-Domain Data Wrappers

Figure 10:
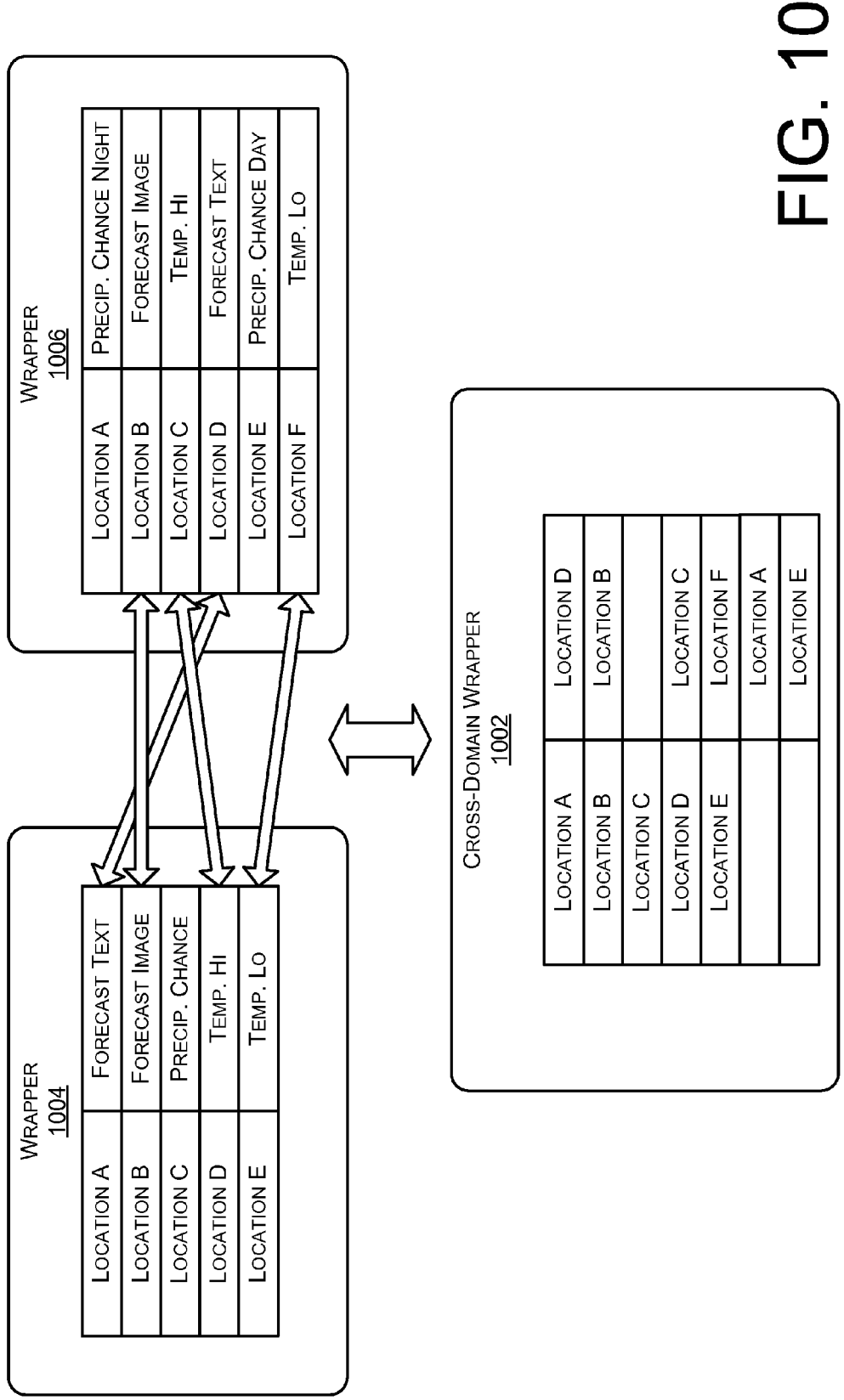
FIG. 10 is a schematic diagram of an illustrative method for mapping wrappers from different domains to create a cross-domain data wrapper.

FIG. 10 depicts an illustrative diagram illustrating a cross-domain data wrapper 1002 formed by mapping two different data wrappers 1004 and 1006. By way of example, and not limitation, the two different data wrappers 1004 and 1006 were built using two different weather documents (not shown). Additionally, the left-most column of each tabularly depicted wrapper contains a location descriptor, for example "Location A" is listed in the first cell of wrapper 1004. The location descriptor details the location in the source document where the data can be found. By way of example, and not limitation, wrapper 1004 shows that "Forecast Text" resides at location A of the original document, "Forecast Image" resides at location B, "Precip. Chance" resides at location C, "Temp. Hi" resides at location D, and "Temp. Lo" resides at location E. In one aspect, more columns may be used for additional descriptors or for details about other documents. For example, a third column may describe which original document the location is pointing to in the case where wrapper 1004 was built using multiple documents.

Wrapper 1006 may have been built using a different source document (or multiple different source documents) and, therefore, may require a different set of location descriptors. For example, "Forecast text" was found at location D in the source document used to build wrapper 1006. In order to build a cross-domain wrapper the location descriptors (or other types of descriptors) may be mapped to one another. This will be particularly helpful when the source documents belong to different domains, have different graphical interface structures, and/or are encoded with different markup languages. By way of example, and not limitation, cross-domain wrapper 1002 may store the mapping between data wrapper 1004 and data wrapper 1006 such that each source location descriptor is mapped to a source location descriptor of the other data wrapper. This mapping will enable the cross-domain wrapper 1002 to find and import conceptually similar data from documents of potentially different structures. Additionally, once mapped, the cross-domain wrapper 1002 may be able to correctly import all appropriate data from documents of the same domain or structure of wrapper 1004 and/or wrapper 1006.

FIG. 10 provides a simplified example of a suitable cross-domain data wrapper according to the present disclosure. However, other configurations are also possible. For example, while the cross-domain data wrapper 1002 is shown to map data from two different wrappers 1004 and 1006, any number of source wrappers could be mapped. Additionally, data wrappers 1004 and 1006 show wrappers built using weather documents (not shown); however, any type of documents containing data would be suitable. For example, documents not available over a network could be used, such as plain text documents, word processing documents, other spreadsheet documents, and even Web documents (such as HTML documents) that are not available over any networks but are simply stored locally or on non-networked devices. Wrappers built from documents available over a network may also be mapped. Additionally, while data wrappers have been shown to include two columns, in practice, any number of columns necessary to describe and map the data wrappers may be present. Furthermore, cross-domain data mapping may be combined with the data templates of FIG. 7 to create cross-domain data templates.

Figure 11:
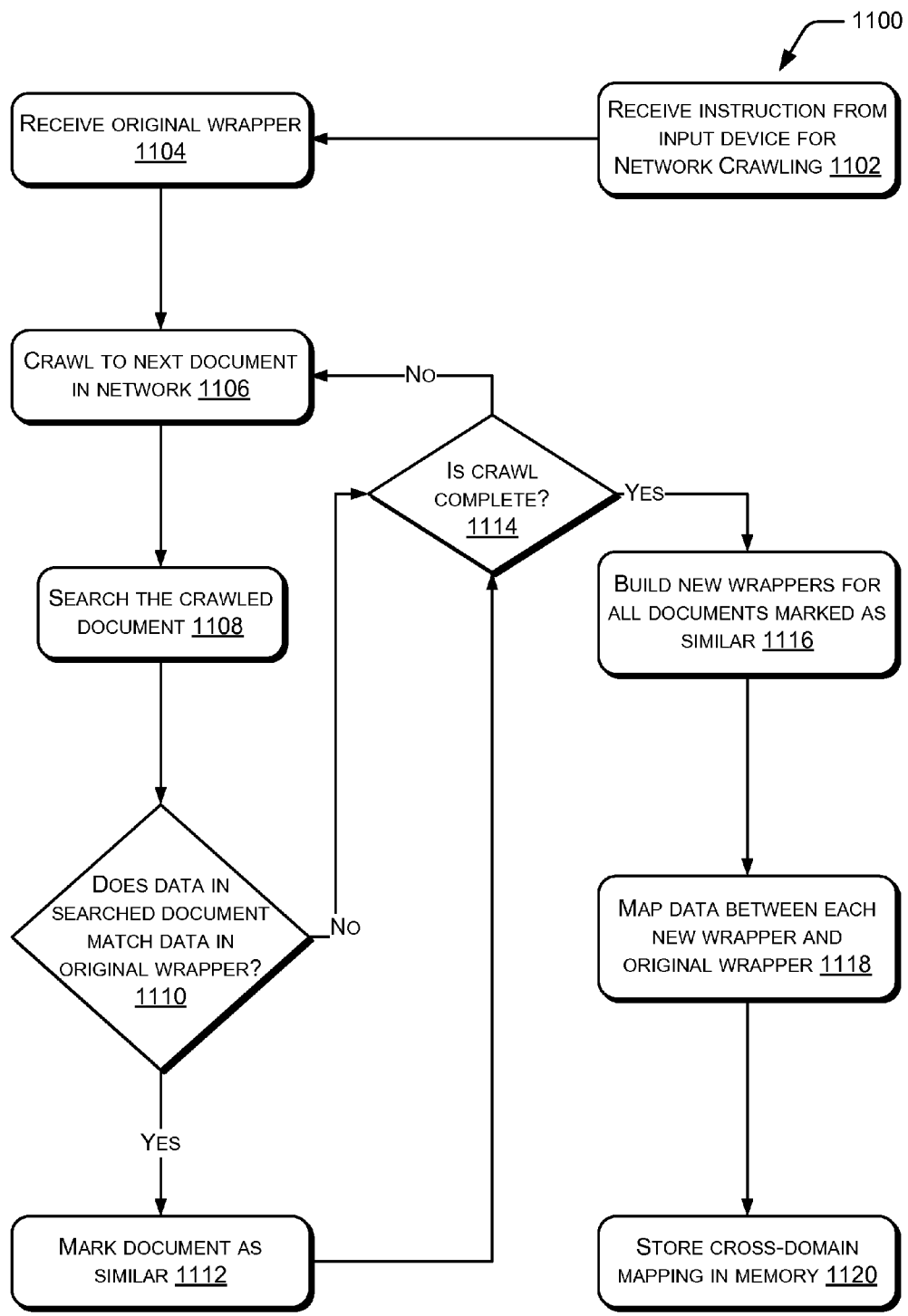
FIG. 11 is a flowchart illustrating details of illustrative network crawling and cross-domain data wrapper mapping methods.

FIG. 11 is a flow diagram of one illustrative method 1100 of document crawling and cross-domain mapping. The method 1100 may, but need not necessarily, be implemented using the interactive synchronization of Web data and spreadsheet system 100 shown in FIG. 1. In this particular implementation, the method 1100 begins at block 1102 in which the method 1100 receives instructions from an input device to begin network crawling. Method 1100 may then receive at least one original wrapper built from a document at block 1104. Since network crawling has begun, method 1100 continues to block 1106 where the next document on the network is accessed. Any crawling algorithm may be used at block 1106. Method 1100 may then search the newly discovered document for data at block 1108 and then, at decision block 1110, method 1100 may determine whether the data in the searched document matches the data in the original wrapper (that is, the data from the original document or documents). Determining if the data matches may require some understanding of the data stored in the original wrapper. The data templates, discussed above, may be helpful at this step.

If it is determined that the data in the document searched matches the data in the source wrapper, the document will be marked as similar at block 1112 and then method 1100 will determine if the network crawl is complete at decision block 1114. However, if the data in the searched document does not match the data in the source wrapper, method 1100 will skip block 1112 and proceed directly to decision block 1114. By way of example, and not limitation, the data of the source wrapper may be weather data while the data of the searched data may be football statistics. In such a situation, it would be determined at decision block 1110 that the data of the source wrapper and the data of the document do not match.

At decision block 1114, method 1100 may determine if the network crawl is complete. The answer may be determined by a user, by a software program, by a selection implementation, or by any other means. In one aspect, a user may decide to end a network crawl because the requested data has been found. If the network crawl is not complete, method 1100 may return to block 1106 in order to continue the network crawl by crawling to the next document in the network. However, if the network crawl is complete, method 1100 may proceed to block 1116 where new wrappers are built for each document that was marked as similar. This step may be optimized by first searching each document marked as similar for duplicates. At block 1118, each new data wrapper is mapped to the source data wrapper to build cross-domain data wrappers for each newly built wrapper. Additionally, any combination of mappings may be envisioned, for example one mapping could be created for all newly built wrappers, only new wrappers with a high percentage of similarities to the source wrapper could be mapped, or only wrappers containing every piece of data that exists in the source wrapper could be mapped. Finally, at block 1120, the cross-domain data wrapper (or wrappers) may be stored in memory. The cross-domain data wrapper (or wrappers) may be stored in the source wrapper, the spreadsheet document associated with the source wrapper, the newly built wrappers, or any other location in memory.

Illustrative methods of interactive synchronization of Web data and spreadsheets are described above. Some or all of these methods may, but need not, be implemented at least partially by an architecture such as that shown in FIG. 4. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable media.

Conclusion

Although the invention has been described in language specific to structural features and/or methodological acts, it is to be understood that the invention is not limited to the specific features or acts described. Rather, the specific features and acts are disclosed as illustrative forms of implementing the invention.

What is claimed is:

1. A computer-implemented method of wrapper induction comprising:
building a wrapper to synchronize data with a spreadsheet application, the building comprising:
displaying a source document;
receiving, using the source document, a selection for a first set of data from the source document, the first set of data to be imported into a spreadsheet document generated by the spreadsheet application;
providing a graphical indication on the source document of a recommendation of additional data from the source document to be selected for importing into the spreadsheet document, the additional data being associated with the first set of data;
determining characteristics of the first set of data selected from the source document and the additional data, wherein the characteristics are used to identify at least a second set of data in the source document or other documents, the second set of data including the characteristics of the first set of data selected from the source document and the additional data;
importing the first set of data from the source document into the spreadsheet document; and
storing the wrapper in the spreadsheet document.

2. The method of claim 1, further comprising:
selecting automatically, based at least in part on the characteristics of the first set of data and the additional data, the second set of data from the source document;
extracting the second set of data from the source document; and
importing the second set of data from the source document into the spreadsheet document.

3. The method of claim 2, further comprising training the wrapper to determine appropriate data to be extracted from at least a second source document based at least in part on the first set of data and the second set of data, the source document and the second source document comprising documents available over a network.

4. The method of claim 3, wherein the source document and the second source document comprise documents available over the network that belong to different domains.

5. The method of claim 1, further comprising:
building a second wrapper from data of a second source document, the source document and the second source document comprising documents available over a network from different domains; and
mapping the wrapper and the second wrapper to create a cross-domain wrapper.

6. The method of claim 1, further comprising displaying a user interface, the user interface configured to receive instructions for at least one of:
storing the wrapper in a computer-readable medium;
storing a copy of the wrapper in the computer-readable medium; or
naming the wrapper or the copy of the wrapper.

7. The method of claim 1, wherein the storing the wrapper in the spreadsheet document comprises encoding the wrapper using Extensible Markup Language (XML).

8. The method of claim 1, further comprising providing a graphical indication on the spreadsheet document that represents a location on the spreadsheet document corresponding to data of the first set of data imported from the source document when a cursor is located over a location of the data in the source document.

9. The method of claim 1, further comprising providing a graphical label on the spreadsheet document that represents a type of data corresponding to a type of data imported from the source document.

10. The method of claim 1, wherein the building of the wrapper further comprises defining a data template of the first set of data imported into the spreadsheet document, the defining comprising:
receiving a description of a data type that corresponds to data of the first set of data imported from the source document, wherein the data type comprises at least one of an image file, a degree of measurement, a plain text file, a hyperlink, a temperature, or a percentage; and
storing the description of the data type in the data template.

11. The method of claim 1, wherein receiving the characteristics of the first set of data comprises automatically determining a data type corresponding to the first set of data selected from the source document.

12. The method of claim 1, wherein the building of the wrapper further comprises providing a spreadsheet selector that displays how the first set of data will be imported into the spreadsheet document.

13. The method of claim 1, further comprising receiving, using the source document, a selection of the additional data, the additional data to be imported into the spreadsheet document.

14. A system comprising:
memory coupled to a processor; and
a wrapper training module, stored in the memory and executable on the processor, to:
receive a wrapper configured to synchronize data with a spreadsheet application, the wrapper comprising a first set of data selected and extracted from a first document available over a network;
provide a graphical indication on the first document of a recommendation of additional data from the first document to be selected for importing into the spreadsheet application, the additional data being associated with the first set of data;
determine characteristics of the first set of data selected and extracted from the first document and the additional data;
based at least in part on the characteristics of the first set of data selected and extracted from the first document and the additional data, determine appropriate data to be extracted from one or more other documents available over the network using the wrapper, wherein the appropriate data includes the characteristics of the first set of data selected and extracted from the first document and the additional data;
extract the appropriate data from the one or more other documents; and
store the appropriate data in a spreadsheet document associated with the spreadsheet application.

15. The system of claim 14, further comprising a wrapper storing module, stored in the memory and executable on the processor, to store the wrapper in the spreadsheet document.

16. The system of claim 14, further comprising a user interface module, stored in the memory and executable on the processor, to display a Uniform Resource Locator (URL) for an additional document of the one or more other documents available over the network, wherein the additional document is associated with at least part of the appropriate data stored in the spreadsheet document.

17. The system of claim 14, further comprising a user interface module, stored in the memory and executable on the processor, to display at least one of:
data editing options for editing the appropriate data prior to storing the appropriate data in the spreadsheet document; or
wrapper editing options for editing the wrapper after the appropriate data has been stored in the spreadsheet document.

18. The system of claim 14, further comprising a network crawling module, stored in the memory and executable on the processor, to:
crawl additional documents on the network;
search at least one additional document of the additional documents; and
employ the wrapper training module to import additional data from the at least one additional document to the spreadsheet document, wherein the additional data is related to the data and the appropriate data.

19. The system of claim 14, further comprising:
a wrapper mapping module, stored in the memory and executable on the processor, to:
receive another wrapper created based at least in part on data from a second document available on the network, the first document and the second document comprising different markup language structures; and
map the data from the wrapper to the data from the another wrapper to create a cross-domain wrapper.

20. A system comprising:
a processor; and
one or more memories, storing computer-executable instructions that, when executed on the processor, perform acts comprising:
receiving data wrappers configured to synchronize data with a spreadsheet application, a first data wrapper created from data of a first source document and a second data wrapper created from data of a second source document, the first source document and the second source document belonging to different domains; and
mapping the first data wrapper and the second data wrapper together to create a cross-domain wrapper, wherein the mapping includes:
determining, from the first data wrapper, a first source location descriptor that identifies a location of a first data item in the first source document;
determining, from the second data wrapper, a second source location descriptor that identifies a location of a second data item in the second source document; and
associating the first source location descriptor with the second location descriptor by matching the first source location descriptor from the first data wrapper with the second source location descriptor from the second data wrapper such that data associated with the first data item from the first source document and data associated with the second data item from the second source document can be imported using the cross-domain wrapper.

* * * * *